United States Patent
Riaudel

(10) Patent No.: US 7,048,663 B2
(45) Date of Patent: May 23, 2006

(54) TOOL FOR FITTING A BELT INTO THE GROOVE OF A PULLEY

(75) Inventor: Thierry Riaudel, Veretz (FR)

(73) Assignee: Hutchinson, Paris (FR)

( * ) Notice: Subject to any disclaimer, the term of this patent is extended or adjusted under 35 U.S.C. 154(b) by 129 days.

(21) Appl. No.: 10/614,728

(22) Filed: Jul. 7, 2003

(65) Prior Publication Data

US 2004/0248681 A1    Dec. 9, 2004

(30) Foreign Application Priority Data

Jun. 4, 2003  (FR) ................... 03 06754

(51) Int. Cl.
*F16H 7/24* (2006.01)
(52) U.S. Cl. .................................... 474/130
(58) Field of Classification Search ........ 474/129–130; 254/54, 129, 131
See application file for complete search history.

(56) References Cited

U.S. PATENT DOCUMENTS

| 298,929 A | * | 5/1884 | Wilson .................. 474/130 |
| 315,615 A | * | 4/1885 | Harnsberger ............. 474/130 |
| 368,094 A | * | 8/1887 | Knight ................. 474/130 |
| 415,921 A | * | 11/1889 | Nichols ................ 474/130 |
| 551,486 A |  | 12/1895 | Brion, Jr. |
| 588,838 A | * | 8/1897 | Savage et al. ........... 474/130 |
| 692,833 A | * | 2/1902 | Crowner ............... 474/130 |
| 697,454 A | * | 4/1902 | Davison ............... 474/130 |
| 774,576 A | * | 11/1904 | Garman ................ 474/130 |
| 1,573,651 A |  | 2/1926 | Smith |

FOREIGN PATENT DOCUMENTS

DE            590763          12/1933
DE         (102 49 914 A1 *  5/2004

* cited by examiner

*Primary Examiner*—Marcus Charles
(74) *Attorney, Agent, or Firm*—Michael Best & Friedrich LLP

(57) ABSTRACT

A tool for fitting a belt into the groove of a pulley. The tool comprises a base plate having a first and a second face. The plate is flat or forms a part of a cylinder and the first face is concave. The tool also comprises first and second holding members that are substantially flat and parallel with each other. The holding members are spaced apart and extend from the first face of the base plate. If the base plate is flat, the holding members are perpendicular to the base plate. If the base plate is not flat, the holding members are perpendicular to the axis of the cylinder at least partially formed by the base plate. The tool also comprises a guide member extending from a second face of the plate opposite to the first face.

19 Claims, 5 Drawing Sheets

TOOL FOR FITTING A BELT INTO THE GROOVE OF A PULLEY

BACKGROUND OF THE INVENTION

The present invention relates to a tool for fitting a belt into the groove of a pulley. It applies more particularly to power transmission belts and more particularly to the motor vehicle field, to the household electrical goods field and to industry.

The Applicant Company markets, in particular as a belt intended for the driving of motor-vehicle accessories (alternator, air conditioning, etc.), a belt that it is possible to fit by stretching and which, after fitting in a transmission system, maintains sufficient tension throughout the lifetime of the belt, without there being any need to tension it by means of a fixed tensioner.

The fitting of this belt (of the so-called "snap-on" type) involves high stresses and it is generally carried out using a fitting tool, whether this be in the factory ("first fitting") or as a replacement.

Fitting tools are already known which involve having a part of the tool in contact with the bottom of the groove of the pulley. Such tools are in particular described in the American patents U.S. Pat. No. 3,138,963 (PRINCE), U.S. Pat. No. 4,111,063 (JOURNEY) and U.S. Pat. No. 4,109,544 (CLARK).

The disadvantage of these devices is that they are suitable only for belts transmitting low powers, because they come directly into contact with the groove of the pulley which they risk damaging.

This risk is even higher for motor vehicle belts (in general of the K type) which have a plurality of serrations to which correspond the complementary profiles of the bottoms of the pulley grooves.

Another fitting tool, of the lever type, has been proposed in the patent U.S. Pat. No. 5,653,654 (DAVIS). It comprises two fingers 20 and 21 forming a lever. In order to use it, it is necessary in advance to slacken the tension of the belt, which is not compatible with a belt of the "snap-on" type for which the transmission system is rightly deprived of a tensioner allowing such an operation.

Other belt tensioners more particularly intended for belts of this type have been proposed for motor vehicle applications. In particular, reference will be made to the European Patent EP 831 247. This type of tool is applied to the cheek and the edge of the pulley.

This has several consequences:

on the one hand, the shape of the tool is relatively complicated, on the other hand, the curvature of the tool is defined by the curvature of the pulley, which means that there are necessarily as many patterns of tools as there are diameters of pulleys, and, finally, because of its position, the tool occupies a non-negligible lateral space.

SUMMARY OF THE INVENTION

The present invention relates to a fitting tool which does not have at least one of the aforementioned disadvantages.

The invention thus relates to a tool for fitting a belt into the groove, serrated or not serrated, of a pulley, characterized in that it comprises:

a base plate having a first and a second face, which is flat or which forms a part of a cylinder having its concavity facing toward the first face;

a first and a second holding member that are substantially flat and that are parallel with each other, which are spaced apart and which extend from a first face of the base plate and perpendicular to the base plate if it is flat, or to the axis of the said cylinder if not flat; and a guide member which extends from a second face of the plate opposite to the first face.

According to a first variant, the two holding members are integral with the base plate and spaced apart by a distance corresponding to the standardized width of a pulley.

According to another variant, the holding members are mobile in translation with respect to each other in such a way as to vary their distance according to the width of the pulley, a means (locking device, spring return, etc.) being provided for fixing the relative position of the holding members.

In particular, a first holding member can be borne by a part that can move in translation with respect to the second holding member which is integral with the base plate.

The guide member can be borne by the part that can move in translation.

It can also be integral with the base plate, in particular at the level of the second holding member which is fixed.

The second holding member can be a folded-down end of the base plate.

The tool can be characterized in that the part that can move in translation has a structure with two branches connected to each other by a central section, one of the branches which defines the first holding member having an opening allowing the passage of the base plate and the other branch having a bearing face for the first face of the base plate.

In order to allow the adjustment of the distance between the bearing members, the said bearing face can have a finger cooperating with holes formed in the base plate, or a profiled edge cooperating by ratchet effect with serrations formed in the first face of the base plate.

The fitting tool can be characterized in that the part that can move in translation has an opening traversed by the base plate and in that it has a return spring of which one end is butted against a bearing plate integral with the base plate and of which the other end bears against the part that can move in translation.

The fitting tool can be characterized in that the guide member extends substantially perpendicular to the said second face and has at least one flat region forming an angle with the first holding member, this flat region facing the outside of a perimeter delimited by the base plate and the first and second holding members, and being located at least partly outside of this perimeter.

Two of the flat regions can preferably be disposed systematically, at the ends of a central region, which is preferably plumb with the first holding member.

The fitting tool can be characterized in that the guide member extends substantially perpendicular to the said second face and has at least one region curved toward the outside of a perimeter delimited by the base plate and the first and second holding members and located at least partly outside of this perimeter.

It can have two curved regions disposed, preferably systematically, on either side of a central region, which is preferably plumb with the first holding member.

The central region is advantageously flat, and it can extend substantially between two opposite edges of the base plate.

BRIEF DESCRIPTION OF THE DRAWINGS

Other characteristics and advantages of the invention will appear on reading the following description with reference to the drawings in which.

DETAILED DESCRIPTION OF THE INVENTION

Figure 1A:
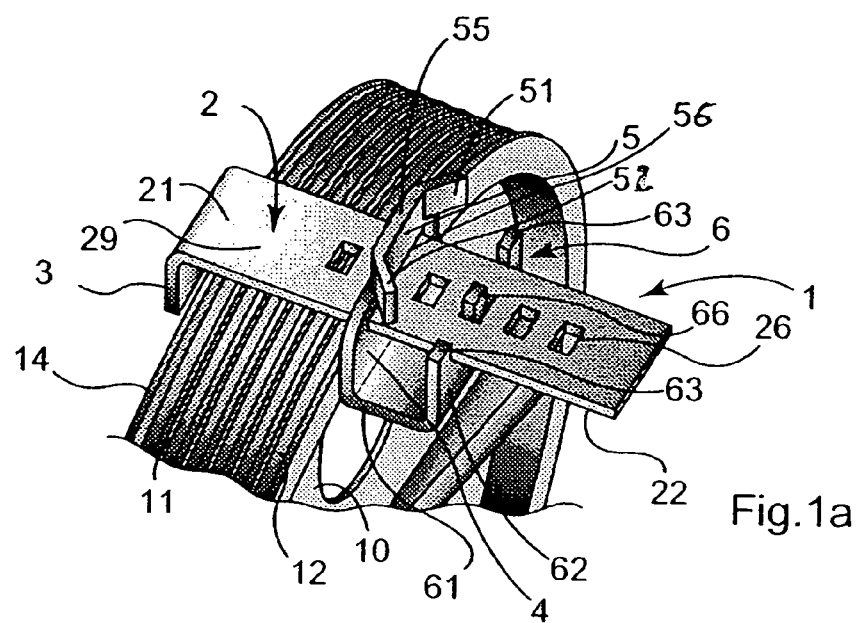
FIG. 1a is a perspective view of one embodiment of a fitting tool according to the invention, FIG. 1b illustrating a configuration during the fitting, FIG. 1c being a cross-section of FIG. 1 taken in the plane of a pulley side.

As shown in FIG. 1a, a fitting tool denoted by the general reference 1 has a flat base plate 2 of generally rectangular shape which has a bent-down end 3 forming a first holding member. A part 6 provided with a rectangular slot 56 which allows the passage of the base plate 2 can slide longitudinally along the latter. The part 6 has, in cross-section, the general shape of a U, with a central part 61, bordered on the one hand by a branch 4 forming a second holding member and in which the rectangular slot 56 is formed and, on the other hand, by a branch 62 which has a bearing face 65 for the lower face 22 of the base plate 2 (see also FIG. 3a). This bearing face 65 has in its central section a pin 66 which can be inserted into one of the openings 26 formed along the base plate 2 in order to fix the distance between the holding members 3 and 4. This distance substantially corresponds to values of width L of a pulley such as the pulley 10 shown in FIG. 1a which the tool 1 straddles. A guide member 5 extends above the upper face 21 of the base plate 2 and forms an extension of the member 4.

This guide member 5 has at least one flat or curved guidance region 51 which is inclined toward the outside of the pulley 10 (in particular by an angle α (FIG. 3d) of less than 30°, for example α=25°) and which is located outside of the perimeter delimited by the members 3 and 4 and the part 29 of the base plate 2 located between the members 3 and 4. A flat central part 55 extends the member 4 upwards. The function of the guidance region 51 is to direct the belt 30 toward the pulley 10 in order to put it into position, whilst the flat central part 55 guides the belt 30 laterally whilst it is passing over the part 29 of the upper face 21. A guidance region 52, symmetrical with the guidance region 51, can be formed on the other side of the central part 55, which allows two directions of rotation for the fitting, everything otherwise being the same.

The fitting of the belt is described with reference to FIGS. 2a to 2d.

Figure 1B:
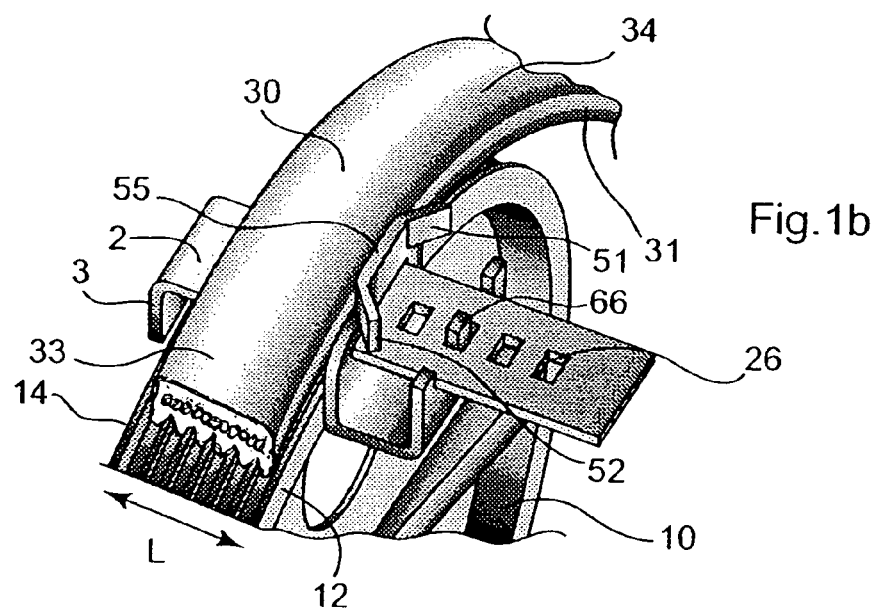
Figure 2A:
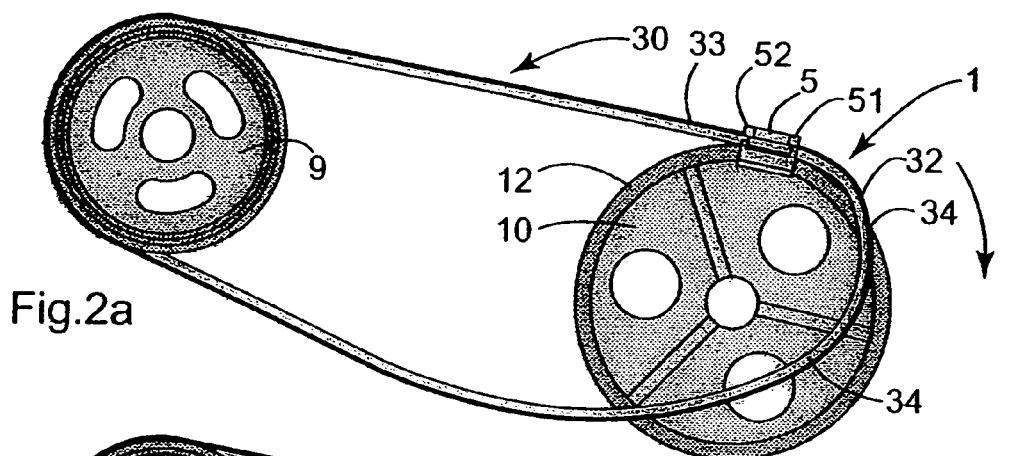
FIGS. 2a to 2d illustrate the sequence of the fitting of a belt with a fitting tool according to the invention, in this case the one shown in FIGS. 1a and 1b, FIGS. 3a to 3d illustrate the distance adjustment between the holding members, in the case of the fitting tool shown in FIGS. 1a and 1b, and FIGS. 3e and 3g illustrate the forces and the torques generated during the fitting.
Figure 2B:
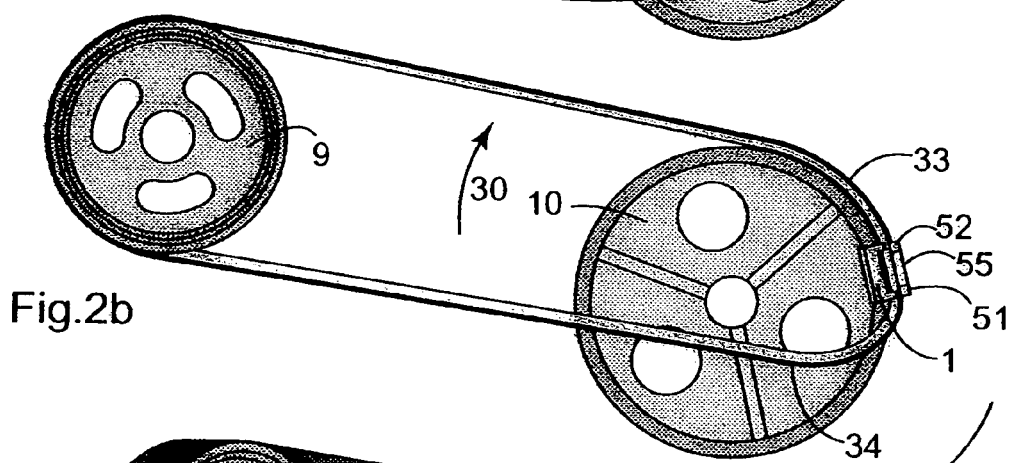

In FIG. 2a, the tool is disposed astride the pulley 10 and the belt in the slackened state is placed over the region 29 of the base plate 2 as shown in FIGS. 1b and 2a, a short section 33 of the belt 30 being already in the groove 11 of the pulley 10 upstream of the fitting tool 1. Downstream of the fitting tool 1, the portion 34 is free and laterally overlaps the edge 12 of the pulley 10. Then, manually or with the help of a tool, the pulley 10 is rotated (in the clockwise direction in FIG. 2a) which has the effect of progressively installing the belt 30 by progressively increasing the length of the portion 33 lodged in the groove 11. In fact, the guidance region 51 bears on the edge 32 of the belt 30 in the region 34 and guides the belt toward the region 29 of the upper face 21.

Figure 2C:
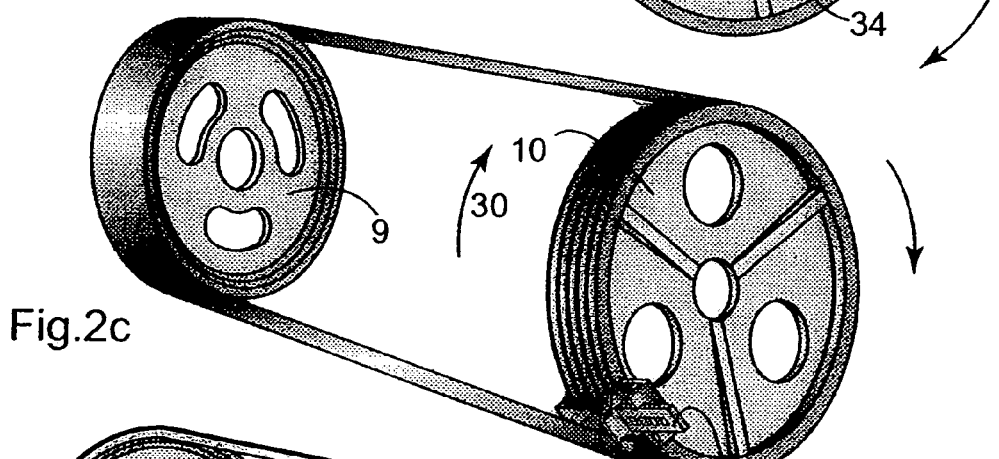
Figure 2D:
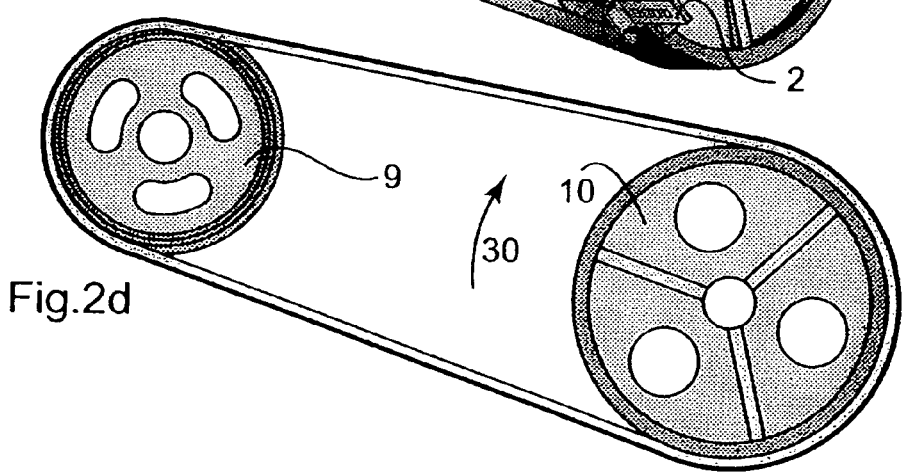

By rotation of the pulley 10 (or movement of the tool 1 over its perimeter), the belt is fully installed (FIG. 2c) and the tool can be withdrawn (FIG. 2c). The fitting of the belt is then complete (FIG. 2d).

Figure 1C:
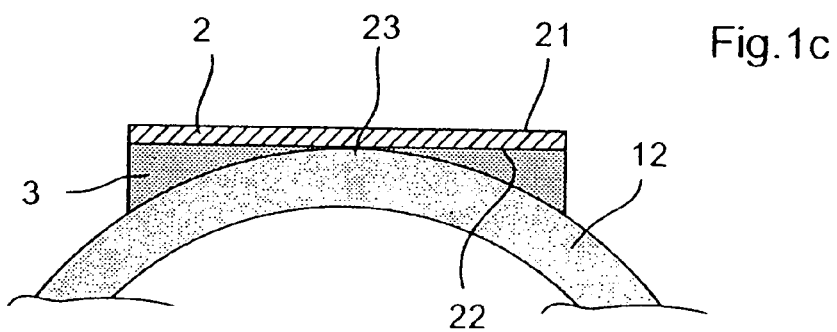

As shown in FIG. 1c, the use of a flat base plate 2 means that there are only two straight segments 23 in contact between the lower face 22 of the base plate 2 and the edges 12 and 14 of the pulley 10. The tool 1 can therefore be used for any diameter of pulley.

The belt 30, because of its passage over the region 29 of the plate 2, is inserted virtually axially into the groove 11 of the pulley 10, without rubbing against the edges 12 of the pulley 30.

The adjustment of the distance between the bearing members 3 and 4 is illustrated by FIGS. 3a to 3d.

Figure 3A:
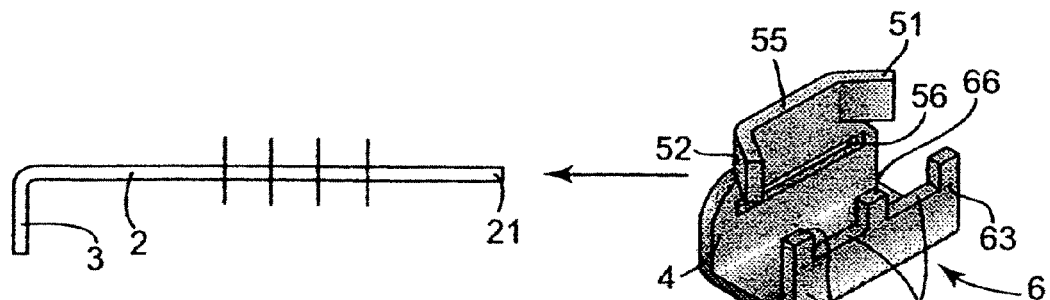

The fitting of the tool is carried out simply by inserting the free end 21 of the base plate 2 into the slot 56 of the part 6 (FIG. 3a).

Figure 3B:
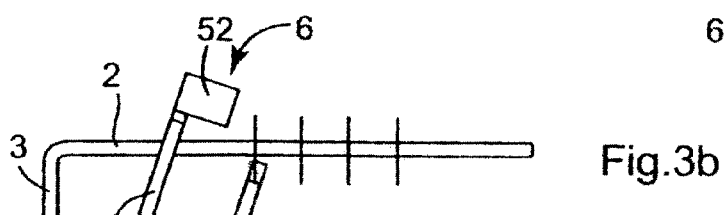
Figure 3C:
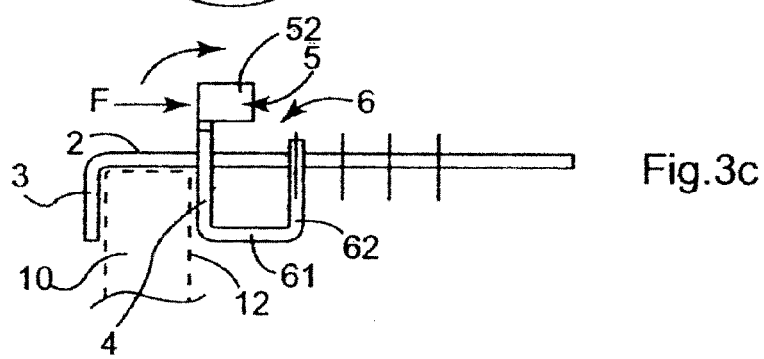
Figure 3D:
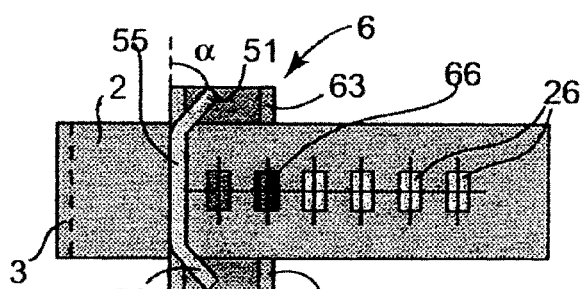

This play between the slot 56 and the plate 2 makes it possible to unlock the part 6 by rocking which allows the longitudinal displacement of the part 6 (FIG. 3b). By reverse rotation, the part 6 is put into position, the pin 66 being inserted into one of the holes 26 (FIGS. 3c and 3d).

Figure 3E:
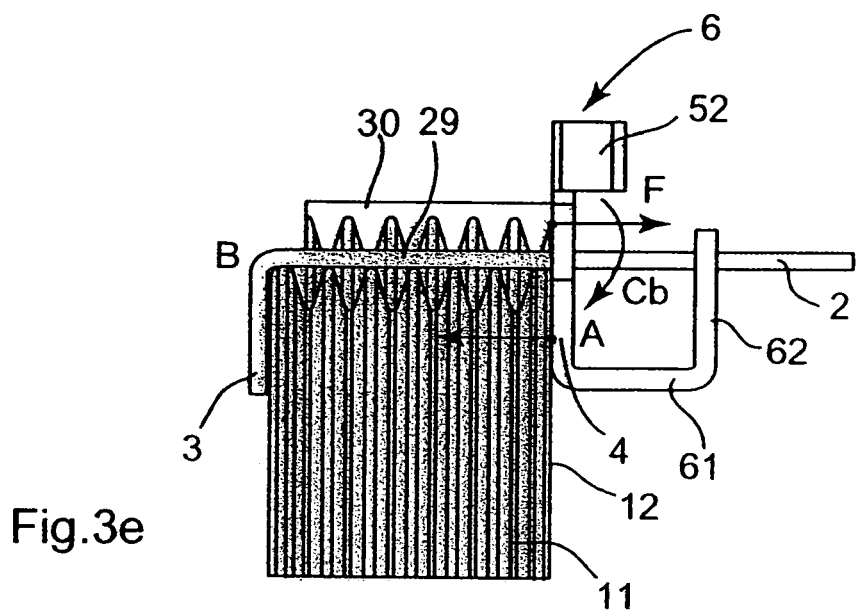
Figure 3F:
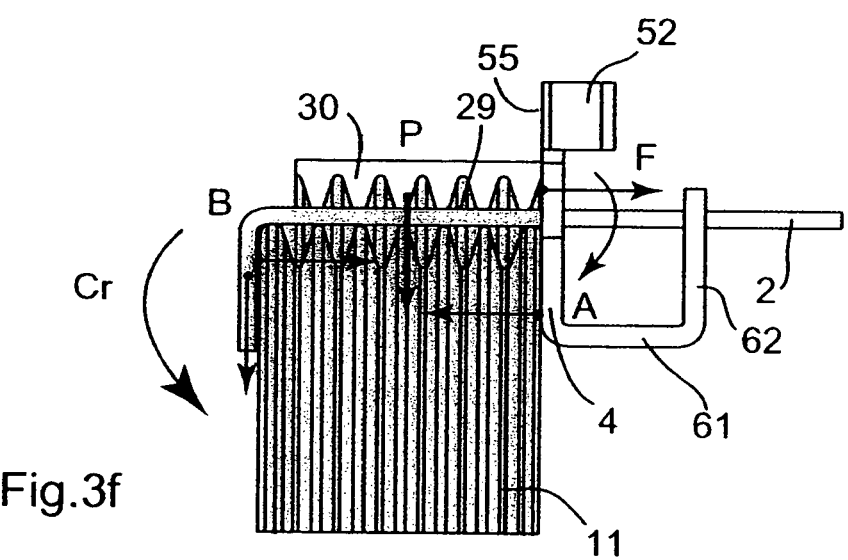
Figure 3G:
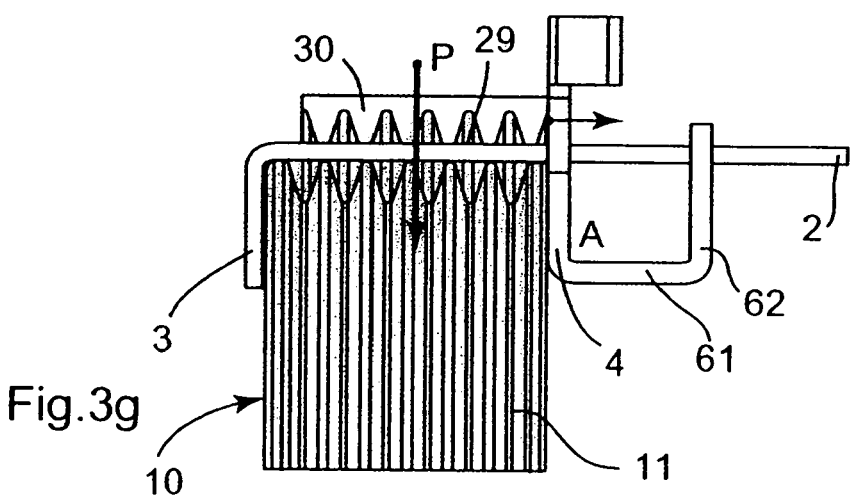

After putting in position astride the pulley 10 and at the start of the rotation (FIGS. 3c and 3e), the lateral force F applied by the edge 32 of the belt during its putting into position induces a rocking torque $C_b$ which allows self-locking of the member 4 against the side 12 of the pulley 10, which positively locks the assembly. After this locking (FIG. 3f), since the pressure P applied by the belt on the region 29 is low, it is the effect of the counter-torque $C_r$, induced by the force F and by the bearing of the member 3 at B on the side 14 and of the member 3 at A on the side 12, that allows the tool to be held in equilibrium throughout the entire rotation. The tool then clamps the pulley between the points A and B. After a larger rotation, the belt is already engaged in the groove of the pulley and it is the effect of the supplementary pressure P in the region 29 which keeps the tool in position. At the end of the fitting (FIG. 3g), there is nothing more than this pressure P effect, since the belt no longer applies any lateral force.

Figure 4:
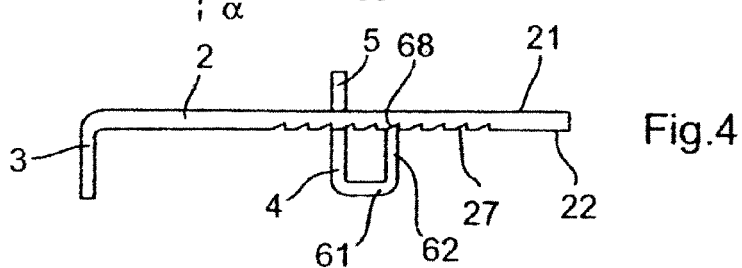
FIGS. 4 to 7, 8a, 8b, 9a and 9b show variants of a fitting tool according to the invention.

In the embodiment shown in FIG. 4, the distance between the members 3 and 4 is adjusted by means of a ratchet type device (68, 27), a serrated rack 27 being formed for this purpose on the lower face 22 of the base plate 2, and cooperating with an inclined edge 68 of the branch 62 upon which the base plate 2 bears.

Figure 5:
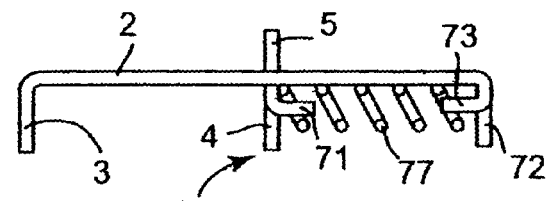

The embodiment shown in FIG. 5 uses a spring which bears at one end of the plate 2 against a folded-down member 72, and at its other end on the member 4. Members 71 and 73, folded down into the axis of the spring allow it to be held in position. In this configuration, the operator separates the part 6 by compressing the spring 77. Once the fitting tool 1 straddles the pulley, the operator releases his action and the tool remains in position due to the action of the spring 77.

Figure 6:
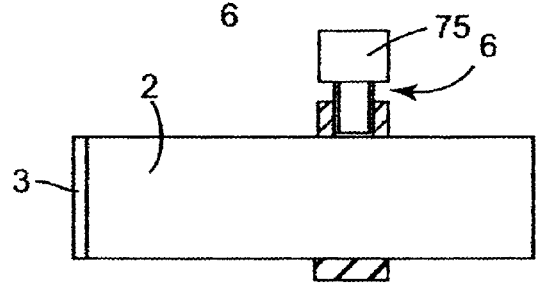
Figure 7:
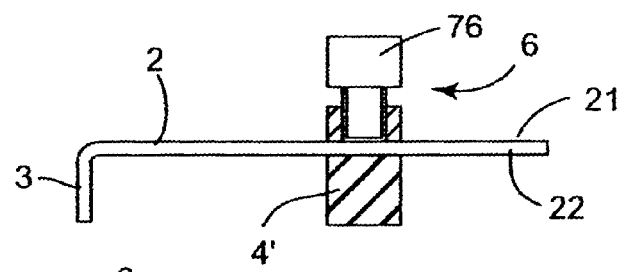

In the embodiments shown in FIGS. 6 and 7, the fixing is carried out by means of a screw, either laterally (FIG. 6) or between the faces 21 and 22 of the plate 2 (FIG. 7).

Figure 9A:
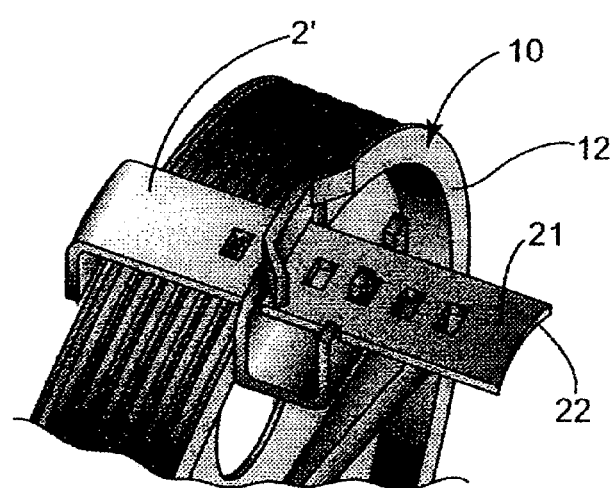
Figure 9B:
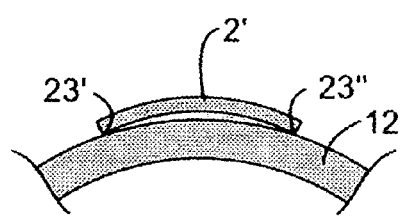

In the embodiments shown in FIGS. 9a and 9b, the plate 2' is cylindrical, with its concavity facing the members 3 and 4 (and therefore facing the pulley 10). The members 3 and 4 are perpendicular to the axis of the cylinders. In this configuration, there are two pairs of straight segments 23' and 23" in contact between the lower face 22 and the edges 12 and 14 of the pulley 10 (FIG. 9b), in the case where the curvature of the plate 2 is more pronounced than that of the pulley 10.

In the opposite case, there is only one pair of segments 23 as in the case of FIG. 1c. In this case the tool can also be used whatever the diameter of the pulley 10 may be. In any event, the presence of a convex face 21 contributes to a better guiding of the belt 30 in the region 29.

Figure 8A:
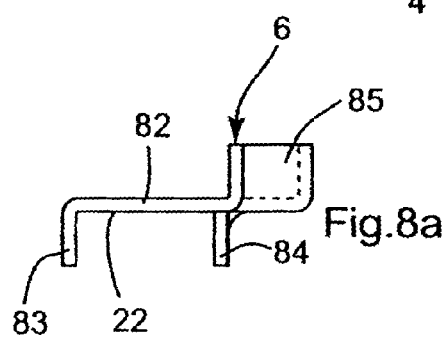
Figure 8B:
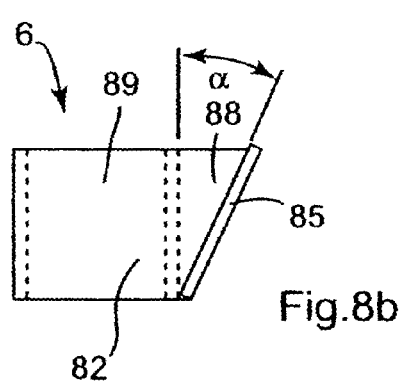

FIGS. 8a and 8b show a one-piece fitting tool which is suitable for only one width L of pulley but which can be used with pulleys of any diameter.

It comprises a base plate 82 having a central plate region 89 delimited on either side by holding members 83 and 84 which extend from the lower face 22.

The central plate 89 (flat or convex in the direction of the members 83 and 84) extends laterally by a region of plate 88 of triangular shape (FIG. 8b) which is bordered by a flat guide member 85 which is inclined by an angle α (for example 25°) with respect to the axis of the members 83, 84. The angle α is preferably less than 30°. The member 85 can be curved, with its concavity facing the outside of the tool.

Other variant embodiments are possible. Thus the guide member or members can be curved toward the outside (being convex in the direction of the pulley). In the preceding embodiments, the flat central region 55 can be omitted.

The tool can be used for fitting any type of belt (in particular a "poly-V" serrated belt of the H, J, K or L type) onto smooth or serrated pulleys. It can also be used with flanged pulleys, with the disadvantage however that the belt will be deformed and taken to a higher tension by the rim of the S-shape associated with the flange.

The invention claimed is:

1. A tool for fitting a belt into the groove of a pulley, the tool comprising:
   a base plate having a first and a second face;
   a first and a second holding member that are substantially flat and that are parallel with each other, which are spaced apart and which extend from the first face of the base plate and perpendicular to a longitudinal axis of the base plate a first surface of the first holding member facing a first surface of the second holding member; and
   a guide member which extends from the second face of the plate opposite to the first face, the guide member having at least a central portion having a flat face in the same plane as the first surface of the first holding member,
   characterized in that the two holding members are adapted to be movable with respect to each other in such a way as to vary their distance according to the width L of the pulley, the tool comprising means for adjusting the relative position of the holding members,
   characterized in that the first holding member is borne by a part that can move in translation with respect to the second holding member which is integral with the base plate,
   characterized in that the part that can move in translation has a structure with two branches connected to each other by a central section, one of the branches which defines the first holding member having an opening allowing the passage of the base plate and the other branch having a bearing face for the first face of the base plate.

2. A tool according to claim 1, characterized in that the said bearing face has a finger cooperating with holes formed in the base plate.

3. A tool according to claim 1, characterized in that the said bearing face has a profiled edge cooperating by ratchet effect with serrations formed in the first face of the base plate.

4. A tool for fitting a belt into the groove of a pulley, the tool comprising:
   a base plate having a first and a second face;
   a first and a second holding member that are substantially flat and that are parallel with each other, which are spaced apart and which extend from the first face of the base plate and perpendicular to a longitudinal axis of the base plate a first surface of the first holding member facing a first surface of the second holding member; and
   a guide member which extends from the second face of the plate opposite to the first face, the guide member having at least a central portion having a flat face in the same plane as the first surface of the first holding member,
   characterized in that the two holding members are adapted to be movable with respect to each other in such a way as to vary their distance according to the width L of the pulley, the tool comprising means for adjusting the relative position of the holding members,
   characterized in that the first holding member is borne by a part that can move in translation with respect to the second holding member which is integral with the base plate
   characterized in that the part that can move in translation has an opening traversed by the base plate and in that it has a return spring of which one end is butted against a bearing plate integral with the base plate and of which the other end bears against the part that can move in translation.

5. A tool according to claim 4, characterized in that the guide member extends substantially perpendicular to the second face of the base plate and has at least one flat surface forming an angle with the first holding member, this flat surface facing the outside of a perimeter delimited by the base plate and the first and second holding members, and being located at least partly outside of this perimeter.

6. A tool according to claim 5, characterized in that the guide member comprises two members disposed at the ends of a central surface.

7. A tool according to claim 6, characterized in that the central surface is flat.

8. A tool according to claim 7, characterized in that the central surface extends substantially between two opposite edges of the base plate.

9. A tool for fitting a belt into the groove of a pulley, the tool comprising:
   a base plate having a first and a second face;
   a first and a second holding member that are substantially flat and that are parallel with each other, which are spaced apart and which extend from the first face of the base plate and perpendicular to a longitudinal axis of the base plate a first surface of the first holding member facing a first surface of the second holding member; and
   a guide member which extends from the second face of the plate opposite to the first face, the guide member having at least a central portion having a flat face in the same plane as the first surface of the first holding member, characterized in that the guide member extends substantially perpendicular to the said second face and has at least one region curved toward the outside of a perimeter delimited by the base plate and the first and second holding members and located at least partly outside of the perimeter.

10. A tool according to claim 9, characterized in that the two holding members are spaced apart by a distance corresponding to the standardized width of a pulley.

11. A tool according to claim 9, characterized in that the two holding members are adapted to be movable with respect to each other in such a way as to vary their distance according to the width L of the pulley, the tool comprising means for adjusting the relative position of the holding members.

12. A tool according to claim 11, characterized in that the first holding member is borne by a part that can move in translation with respect to the second holding member which is integral with the base plate.

13. A tool according to claim 12, characterized in that the guide member is borne by the part that can move in translation with respect to the second holding member.

14. A tool according to claim 12, characterized in that the guide member is integral with the base plate.

15. A tool according to claim 12, characterized in that the second holding member is a folded, down end of the base plate.

16. A tool according to claim 9, characterized in that the guide member comprises two curved members located on either side of a central surface.

17. A tool as in claim 9, wherein the guide member is integral with the first holding member.

18. A tool for fitting a belt into the groove of a pulley, the tool comprising:

a base plate having a first and a second face;

a first and a second holding member that are substantially flat and that are parallel with each other, which are spaced apart and which extend from the first face of the base plate and perpendicular to a longitudinal axis of the base plate a first surface of the first holding member facing a first surface of the second holding member; and a guide member which extends from the second face of the plate opposite to the first face, the guide member having at least a central portion having a flat face in the same plane as the first surface of the first holding member, wherein the guide member is integral with the first holding member, wherein the guide member and the first holding member are movable along the base plate and are separated by an opening allowing the passage of the base plate.

19. A tool according to claim 18, characterized in that the two holding members are spaced apart by a distance corresponding to the standardized width of a pulley.

* * * * *